United States Patent
Wasilewski

(10) Patent No.: US 7,630,499 B2
(45) Date of Patent: Dec. 8, 2009

(54) RETRIEVAL AND TRANSFER OF ENCRYPTED HARD DRIVE CONTENT FROM DVR SET-TOP BOXES

(75) Inventor: Anthony J. Wasilewski, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 682 days.

(21) Appl. No.: 10/920,926

(22) Filed: Aug. 18, 2004

(65) Prior Publication Data

US 2006/0041905 A1 Feb. 23, 2006

(51) Int. Cl.
*H04L 9/08* (2006.01)
*H04N 7/167* (2006.01)

(52) U.S. Cl. .............. 380/286; 380/239; 380/255; 725/31; 726/26

(58) Field of Classification Search ............ 726/26; 380/286, 239, 255
See application file for complete search history.

(56) References Cited

U.S. PATENT DOCUMENTS

| | | | |
|---|---|---|---|
| 6,020,982 A | 2/2000 | Yamauchi et al. | |
| 6,157,719 A | 12/2000 | Wasilewski et al. | |
| 6,173,400 B1 | 1/2001 | Perlman et al. | |
| 6,230,269 B1 | 5/2001 | Spies et al. | |
| 6,292,568 B1 | 9/2001 | Akins | |
| 6,345,307 B1 | 2/2002 | Booth | |
| 6,356,971 B1 | 3/2002 | Katz et al. | |
| 6,727,944 B1 | 4/2004 | Adachi | |
| 6,748,080 B2 | 6/2004 | Russ et al. | |
| 6,804,357 B1 * | 10/2004 | Ikonen et al. | 380/241 |
| 7,062,658 B1 * | 6/2006 | Cheriton et al. | 713/189 |
| 7,065,216 B1 * | 6/2006 | Benaloh et al. | 380/282 |

(Continued)

FOREIGN PATENT DOCUMENTS

EP 0 782 296 7/1997

(Continued)

OTHER PUBLICATIONS

"Explorer 8300 Series Digital Recorder" ScientificAtlanta.com [online] Oct. 2005, XP002459851, Retrieved from the Internet: URL:http://www.cisco.com/application/pdf/en/us/guest/products/ps8613/c1650/cdccont_0900aecd806c6913.pdf [retrieved on Nov. 22, 2007].

(Continued)

*Primary Examiner*—Matthew B Smithers
*Assistant Examiner*—Luu Pham
(74) *Attorney, Agent, or Firm*—Lewinski Law Group LLC

(57) ABSTRACT

A system and method for retrieval and transfer of encrypted content from a failed set-top box. When content is recorded to the storage device of a set-top box, the content is encrypted with a content instance key. This content instance key is encrypted with the public key of the set-top box and a duplicate of the content instance key is encrypted by another public key other than the public key of the set-top. In the event the set-top fails, the encrypted content on the storage device may be retrieved from the storage device by decrypting the duplicate content instance key with the private key that corresponds with the public key that encrypted the duplicate of the content instance key.

41 Claims, 7 Drawing Sheets

U.S. PATENT DOCUMENTS

| | | | |
|---|---|---|---|
| 7,155,609 B2 * | 12/2006 | Chan et al. | 713/171 |
| 7,181,010 B2 | 2/2007 | Russ et al. | |
| 7,200,868 B2 * | 4/2007 | Mattox et al. | 726/26 |
| 2001/0006400 A1 | 7/2001 | Kubo et al. | |
| 2002/0013772 A1 * | 1/2002 | Peinado | 705/51 |
| 2002/0018130 A1 | 2/2002 | Suemoto et al. | |
| 2002/0146237 A1 | 10/2002 | Safadi | |
| 2003/0009668 A1 * | 1/2003 | Chan et al. | 713/171 |
| 2003/0093680 A1 | 5/2003 | Astley et al. | |
| 2003/0188164 A1 | 10/2003 | Okimoto et al. | |
| 2004/0039911 A1 * | 2/2004 | Oka et al. | 713/175 |
| 2004/0052377 A1 | 3/2004 | Mattox et al. | |
| 2004/0128499 A1 | 7/2004 | Peterka et al. | 713/155 |
| 2004/0187014 A1 * | 9/2004 | Molaro | 713/200 |
| 2005/0080497 A1 | 4/2005 | Rao | |
| 2005/0100162 A1 * | 5/2005 | Alve et al. | 380/210 |
| 2005/0102513 A1 | 5/2005 | Alve | |
| 2005/0237396 A1 | 10/2005 | Hagiwara et al. | |
| 2005/0262529 A1 * | 11/2005 | Neogi et al. | 725/31 |
| 2006/0020786 A1 | 1/2006 | Helms et al. | |
| 2006/0039256 A1 | 2/2006 | Nakamura et al. | |
| 2006/0041905 A1 | 2/2006 | Wasilewski | |
| 2006/0072752 A1 | 4/2006 | Nakano et al. | |
| 2006/0074807 A1 | 4/2006 | Gauba et al. | |

FOREIGN PATENT DOCUMENTS

| | | |
|---|---|---|
| EP | 1 014 715 | 6/2000 |
| GB | 2 403 586 A | 1/2005 |
| WO | WO 00/51041 | 8/2000 |
| WO | WO 01/82588 | 11/2001 |
| WO | WO 2005/029843 | 3/2005 |
| WO | WO 2005/029852 | 3/2005 |
| WO | WO 2005/091626 | 9/2005 |
| WO | WO 2005/101411 | 10/2005 |
| WO | WO 2006/038204 | 4/2006 |

OTHER PUBLICATIONS

GILO: "Do It Yourself Making an External Hard Drive Guide" Notebookreview.com, [online], Jun. 2, 2006, XP002459852, Retrieved from the Internet: URL:http//www.notebookreview.com/default.asp?newsID=2972 [retrieved on Nov. 22, 2007].

U.S. Appl. No. 10/873,805, filed Jun. 22, 2004, Entitled "Validating Client Receivers," Inventors: Pinder et al.

U.S. Appl. No. 10/920,841, filed Aug. 18, 2004, Entitled "Retrieved and Transfer of Encypted Hard Drive Content from Ditgal Video Receiver Set Top Box Utilizing Second Digital Video Receiver Set Top Box," Inventor: Wasilewski, Anthony.

U.S. Appl. No. 10/920,842, filed Aug. 18, 2004 Entitled "Utilizing of Encrypted Hard Drive Content by One Digital Video Receiver Set Top Box when Recorded by Another," Inventor: Wasilewski, Anthony.

U.S. Appl. No. 10/405,205, filed Apr. 17, 2006, Entitled "System and Method for Prioritizing the Storage Location of Media Data," Inventors: Prus et al.

U.S. Appl. No. 11/428,367, filed Jun. 30, 2006, Entitled "Secure Escrow and Recovery of Media Device Content Keys," Inventors: Schlarb et al.

U.S. Appl. No. 11/454,421, filed Jun. 16, 2006, Entitled "Securing Media Content Using Interchangeable Encryption Key," Inventors: Pinder et al.

U.S. Appl. No. 11/428,362, filed Jun. 30, 2006, Entitled "System and Method for Managing Media Data," Inventors: Prus et al.

U.S. Appl. No. 11/428,356, filed Jun. 30, 2006, Entitled "System and Method for Applying Retention Rules," Inventors: Prus et al.

U.S. Appl. No. 11/428,357, filed Jun. 30, 2006, Entitled "Digital Media Device having Spectable Media Content Storage Locations," Inventors: Prus et al.

U.S. Appl. No. 11/428,365, filed Jun. 30, 2006, Entitled "Digital Media Device having Media Content Transfer Capability," Inventors: Russ et al.

U.S. Appl. No. 11/671,506, filed Feb. 6, 2007, Entitled "Apparatus for Entitling and Transmitting Service Instances to Remote Client Devices," Inventors: Russ et al.

U.S. Appl. No. 11/942,778, filed Nov. 20, 2007 Entitled "Retrieval and Transfer of Encrypted Hard Drive Content from Digital Video Receiver Set Top Box to a Content Transcription Device," Inventor: Wasilewski, Anthony.

* cited by examiner

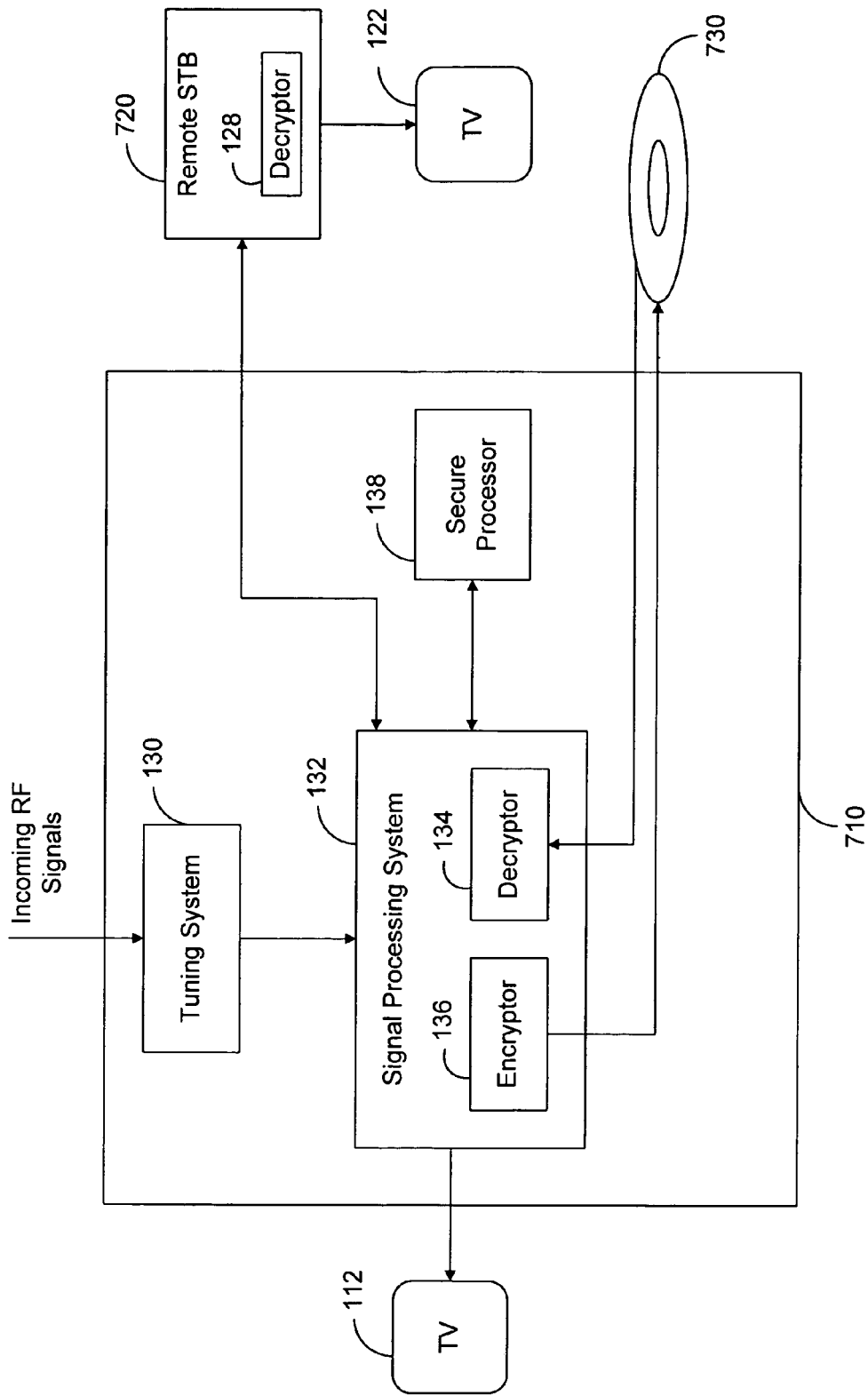

RETRIEVAL AND TRANSFER OF ENCRYPTED HARD DRIVE CONTENT FROM DVR SET-TOP BOXES

CROSS-REFERENCE TO RELATED APPLICATIONS

The present U.S. application is related to U.S. application entitled "RETRIEVAL AND TRANSFER OF ENCRYPTED HARD DRIVE CONTENT FROM DVR SET-TOP BOX UTILIZING SECOND DVR SET-TOP BOX" and to U.S. application entitled "UTILIZATION OF ENCRYPTED HARD DRIVE CONTENT BY ONE DVR SET-TOP BOX WHEN RECORDED BY ANOTHER", both to the same inventor, which are incorporated herein by reference, and having been filed concurrently with the present application.

TECHNICAL FIELD

The present invention relates to the field of set-top terminals and, more particularly, relates to the storage, recovery and transfer of encrypted content from a storage device for reuse without utilizing the original secure microprocessor.

BACKGROUND OF THE INVENTION

Recording content to a storage device such as a hard drive of a set-top box (STB) is a popular service available to cable subscribers. A digital video recorder (DVR) application provides user interface screens that can be used to manage the content of the storage device. With the content recorded on the storage device, the subscriber can play back the content whenever they want while also utilizing VCR-like functionality such as pause, rewind, fast-forward and delete. To ensure content security, the digital content streams are encrypted before they are stored onto the storage device. A single content instance key of suitable strength is used to encrypt the entire stream.

The content instance key is then encrypted by the public key of the STB and stored on the storage device in association with the encrypted content and any other access rights elements. Typically, subscribers create a personal library of their stored encrypted content. When the subscriber wishes to replay the recorded content, the STB's private key is provided to decrypt the encrypted content instance key and any other access rights elements to the encrypted content.

However, when a set-top fails, it may not be possible to access the secure microprocessor to allow decryption of the stored content from the storage device. Consequently, the subscriber's personal library may become inaccessible. Therefore, what is needed is a system and method that allows the subscriber to retrieve encrypted content and then transfer the content to be played by a new replacement STB even though the storage device's content can not be decrypted with the original secure microprocessor of the failed STB.

BRIEF DESCRIPTION OF THE DRAWINGS

FIG. 7 illustrates a generalized block diagram of a third interactive digital STB adapted for use with removable storage media.

DETAILED DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

Figure 1:
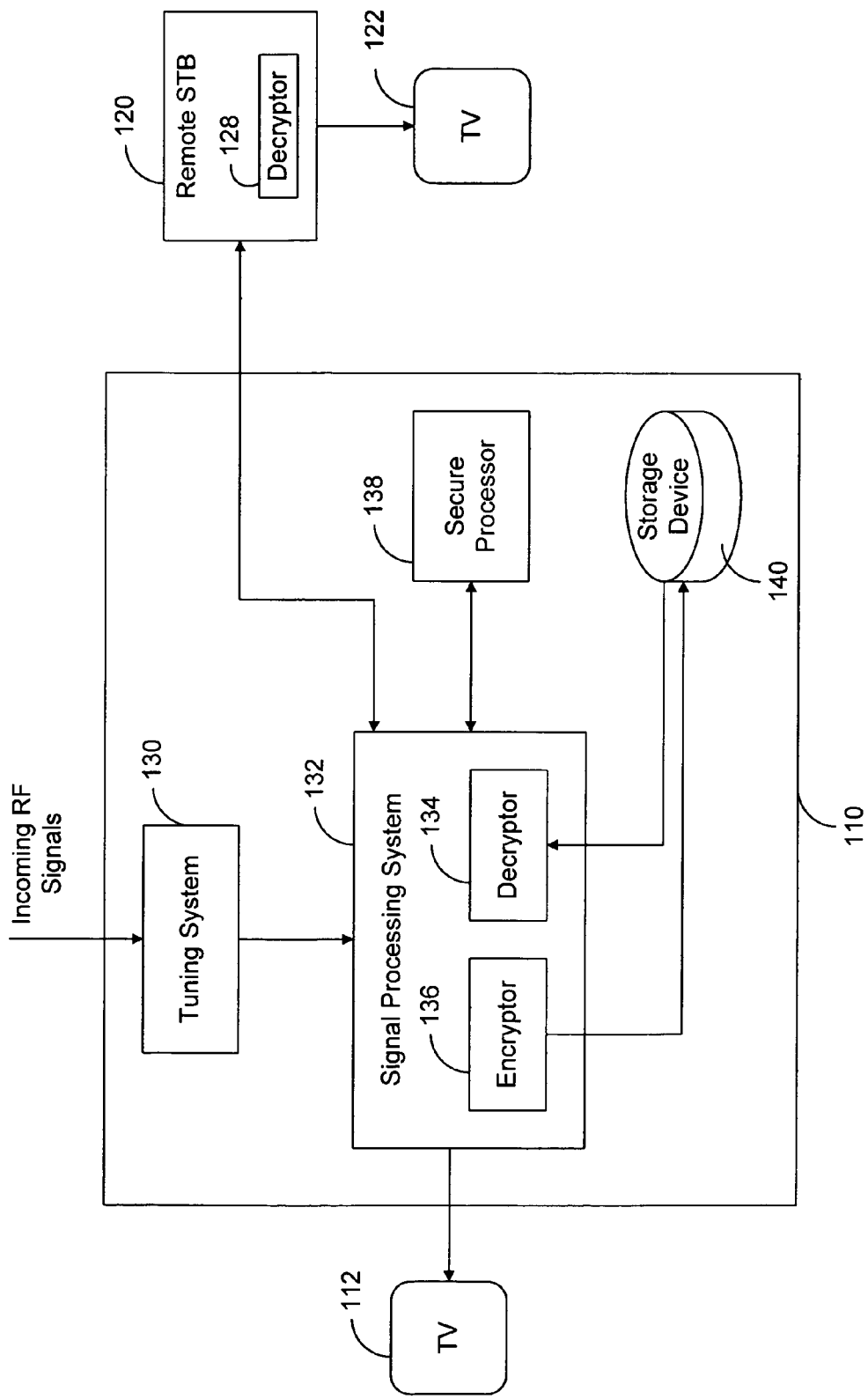
FIG. 1 illustrates a generalized block diagram of an interactive digital STB having a storage device for recording encrypted content.

FIG. 1 illustrates a block diagram of a generalized digital STB 110 coupled to a television 112. The STB 110 includes DVR functionality and may be coupled to a remote STB 120 typically located within a subscriber's premises that is in turn coupled to another television 122. The STB 110 may be coupled to a plurality of remote STBs capable of receiving broadband signals directly from the provider while also requesting and receiving from the STB 110 cable channels, stored or recorded content, a VOD movie, or the interactive program guide, just as if the remote STBs were equipped with the functionality of the STB 110. Only one remote STB 120 is shown for convenience.

A multiple systems operator (MSO) transmits signals from a headend or central office over a communications network to a plurality of subscribers having a STB such as the STB 110. The service provided includes a number of program services. Each program provided from a program source is an "instance" of that program source. When an instance is broadcast, it is encrypted to form an encrypted instance containing instance data which is the encrypted information making up the program. This information is delivered to the STB 110. Authorization information is also sent to the STB 110 and, if the subscriber is entitled to watch the program of the encrypted instance, the STB 110 may then decrypt the encrypted instance. An overview of encryption and decryption of the signals to and from the headend service provider can be found in U.S. Pat. No. 6,292,568.

The STB 110 in one exemplary embodiment further includes a tuner system 130 that preferably includes at least two tuners and at least one RF transmitter so that the STB 110 can transmit an independent signal to the remote STB 120. The incoming signal from the headend service provider arrives at the tuner system 130 that filters out the unwanted source signals and tunes to a selected television signal. In some embodiments, the tuner system 130 includes a demultiplexor because the tuned signal may contain several different programs or television signals multiplexed into the same tuned program stream. A demultiplexor would select the particular television signal from the channel or program stream that has been tuned.

The filtered signal is forwarded to the signal processing system 132 that includes a CPU, memory, an operating system, and the DVR application in addition to one or more other software and/or hardware modules to demodulate and decode the filtered signal. As shown in the embodiment of FIG. 1, the signal processing system 132 includes a decryptor 134 for decrypting the selected television signal and providing it in the clear to television 112. The signal processing system also includes an encryptor 136. The subscriber may decide to record the instance decrypted by the decryptor 134 to a storage device 140 which must then be re-encrypted by encryptor 136. The storage device 140 is preferably an internal or external hard drive sized to hold the desired amount of recorded programming. The encrypted signal corresponding to the instance to be recorded is then forwarded and recorded to the storage device 140 for storage. A content instance key from the encryptor 136 is used to encrypt each instance recorded to the storage device 140. This content instance key may be commonly referred to as a bulk encryption key. In some cases, the same content instance key may be used to encrypt more than one or every instance recorded to the storage device. Signal processing system 132 determines the storage location of the encrypted instance on the storage device 140. The signal encrypted by encryptor 136 may also be forwarded to the STB 120, before or after the signal is recorded to the storage device 140, where the decryptor 128 of STB 120 then decrypts the signal and transmits it for presentation on the television 122.

Figure 2:
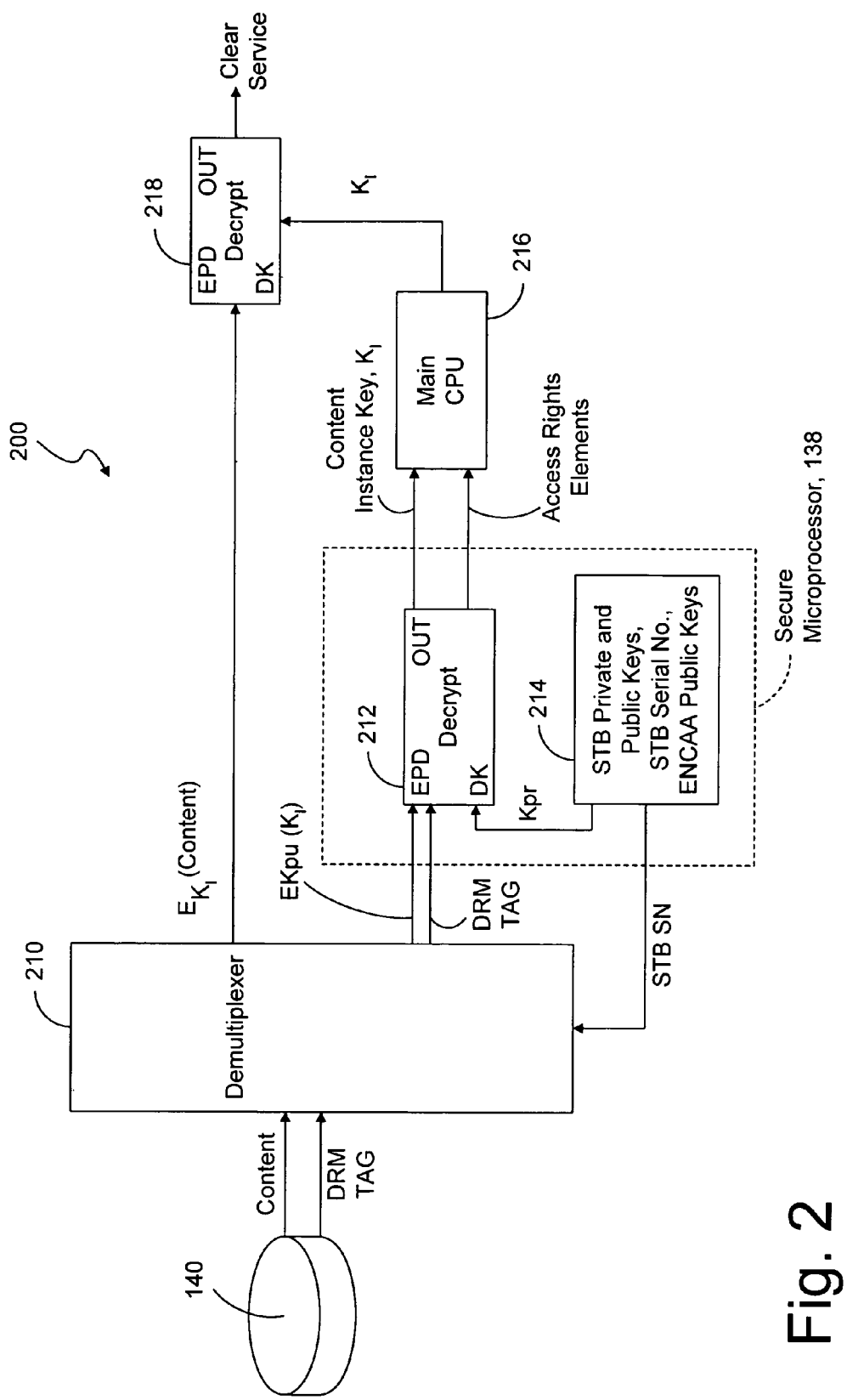
FIG. 2 illustrates one embodiment for decoding encrypted content according to the present invention.

Referring now to FIG. 2, in order to retrieve content from the storage device 140 for viewing on the television 112, the stored encrypted content and DRM parameters are transmitted back to a content security unit 200 of the STB 110. The public serial number of the STB 110 is provided from memory 214 to a demultiplexer 210 of the content security unit 200 so that the demultiplexor 210 can select an encrypted instance key encrypted to the content security unit 200. Encrypted instance key $EK_{pu}(K_I)$ is decrypted in decryptor 212 of the secure microprocessor 138 using the STB 110's private key $K_{PR}$ from memory 214 to provide content instance key $K_I$. The content instance key $K_I$ is then provided, along with the access rights elements, to the main CPU 216 in the signal processing system 132 of the STB 110. The access rights of the subscriber utilizing the STB 110 are reviewed to determine whether the subscriber may still have access to the stored content retrieved from the storage device 140. In another embodiment, the determination of subscriber access rights may be carried out within secure microprocessor 138. Once the access rights have been verified, the encrypted content is processed in decryptor 218 of the signal processing system 132 using the content instance key $K_I$ to recover the content instance in the clear.

Figure 3:
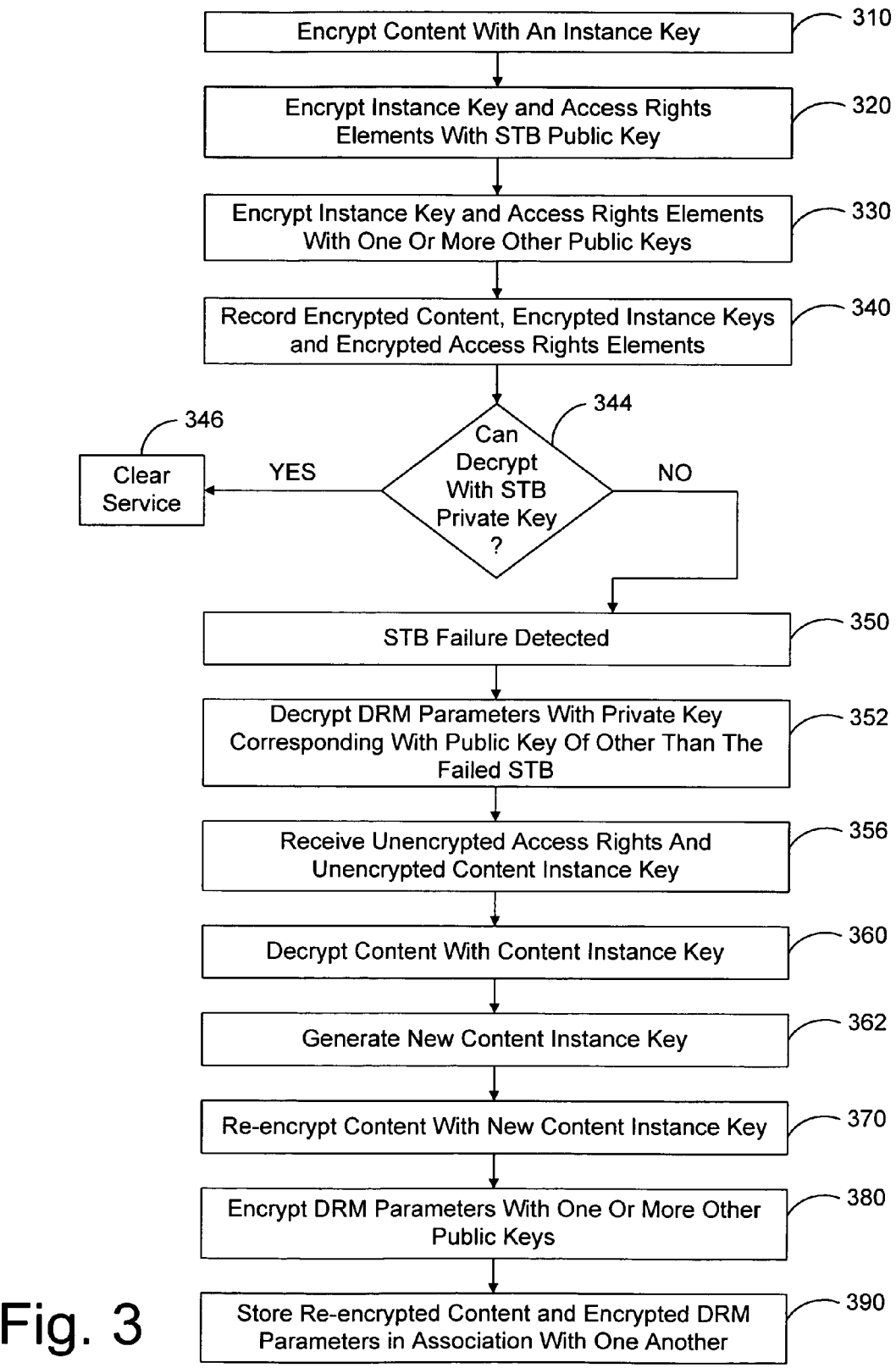
FIG. 3 is a flow chart illustrating one embodiment of a content retrieval and transfer system of the present invention.

In the event the STB 110 fails, it is desirable to retrieve the encrypted content stored on the storage device 140 even though the content on the storage device 140 can no longer be accessed and decrypted utilizing the original secure microprocessor 138 of the STB 110. The flow chart of FIG. 3 illustrates one embodiment for storing encrypted content to the storage device 140 while using the original secure microprocessor 138 so that it may subsequently be retrieved and transferred from the storage device 140 without then using the original secure microprocessor 138 of the STB 110. This process is initiated at process block 310 where the content to be recorded to the storage device 140 is encrypted with the content instance key as explained above. Then, as shown in process block 320, the content instance key is encrypted with the public key of the STB 110. The encrypted instance key can be decrypted with a private key that corresponds with the STB 110's public key in a defined public/private key pair.

However, in the present invention as shown in process block 330, a duplicate of the content instance key is also encrypted with one or more public keys of other than the STB 110. For example, the duplicate of the content instance key may be encrypted with the public key of one or more of the MSO's headends. Although content instance keys may be referred to as either an original content instance key or as a duplicate content instance key, they are substantially indistinguishable from one another and either should not necessarily be referred to as preceding the other. The content encrypted with the content instance key, the content instance key encrypted by the public key of the STB 110, and the duplicate content instance key encrypted by one or more other public keys, are stored on the storage device 140 in association with one another as shown in block 340.

The content instance key in combination with the access rights elements are referred to as digital rights management (DRM) parameters or DRM tag. In one embodiment of the present invention, the original DRM parameters may also be duplicated so that the duplicated content instance key is part of a duplicate of the DRM parameters. Therefore, there is preferably separate DRM parameters to be encrypted by each of the one or more public keys that may be utilized in place of the public key of the STB 110 for encrypting subsequent occurrences of the original content instance key. The access rights elements of the original DRM parameters or the duplicated access rights elements that are part of any duplicate DRM parameters may be modified to reflect the possible decryption of the DRM parameters by the other public key users. Therefore, it is preferable that the access rights elements of DRM parameters for use by the other public key users such as a MSO's headend be more lenient than those associated with the subscriber's STB that likely has an associated expiration time.

Turning now to decision block 344, if the STB 110 can decrypt the stored instance on the storage device 140, the instance is then provided in the clear, as shown in process block 346, to the television 112. On the other hand, if the STB 110 has failed and can no longer decrypt recorded instances utilizing its original secure microprocessor 138, a STB failure is detected as indicated in process block 350. The storage device 140 may then be removed or detached from the failed STB. In one embodiment, the storage device 140 may itself be forwarded to the service provider so that retrieval and transfer of the content on the storage device 140 may be performed.

The retrieval and transfer of the content from the storage device 140 may be performed by a content transcription device (CTD) that is a purpose-built device that would be able to use the appropriate private key to decrypt the duplicate of the encrypted content instance key as well as the access rights elements. For example, the CTD could use a private key such as the conditional access authority (CAA) of the MSO or a site-specific headend private key such as the entitlement agent (EA). The CTD may also perform one or more other functions as outlined below. Preferably, the CTD is maintained at the headend in order to have strong physical protection.

Still referring to FIG. 3, in process block 352, the DRM parameters, which include the access rights elements and the duplicate content instance key, that had been encrypted with a public key of other than the failed STB 110, such as the public key of the MSO headend, is decrypted with the corresponding private key of the MSO headend. Unencrypted access rights elements and the duplicate content instance key are received, as shown in process block 356, in order to determine the subscriber's access rights and then decrypt the encrypted content with the duplicate content instance key. The encrypted content from the storage device 140 is decrypted, as shown in process block 360, by using the private key corresponding with the public key of other than the failed STB 110, such as the public key of the MSO headend. For example, a private key of the MSO headend, which corresponds with the public key that had encrypted the duplicate of the content instance key, is used to decrypt the duplicate of the content instance key. The decrypted duplicate content instance key may then be used by the CTD to then decrypt the encrypted content from the storage device 140.

Once the content retrieved from the storage device 140 is in the clear, the content may be returned to the subscriber for future access in accordance with the subscriber's access rights. However, the retrieved content would preferably be re-encrypted and re-recorded to the storage device 140 or transferred to some other storage device. Process block 362 illustrates generating a new content instance key for re-encrypting the retrieved content. The retrieved content is re-encrypted as shown in block 370 using a new content instance key preferably having a quality similar to that of the original content instance key. However, the original content instance key may be preferably utilized because of its high quality and because the CTD would not then need to have the functionality necessary to generate a new content instance key of suitable quality.

Also, one or more public keys should then be used to encrypt the instance key and duplicates thereof, respectively, as well as the corresponding DRM parameters, that are then stored in association with the retrieved content as shown in process block 380 of FIG. 3. Each of the DRM parameters would include access rights elements for determining the subscriber's access rights as well as include a version of the content instance key that was used to re-encrypt the retrieved content. If permitted by the content providers, the subscriber's access rights may be modified as part of the recovery and/or transfer processes.

Figure 4:
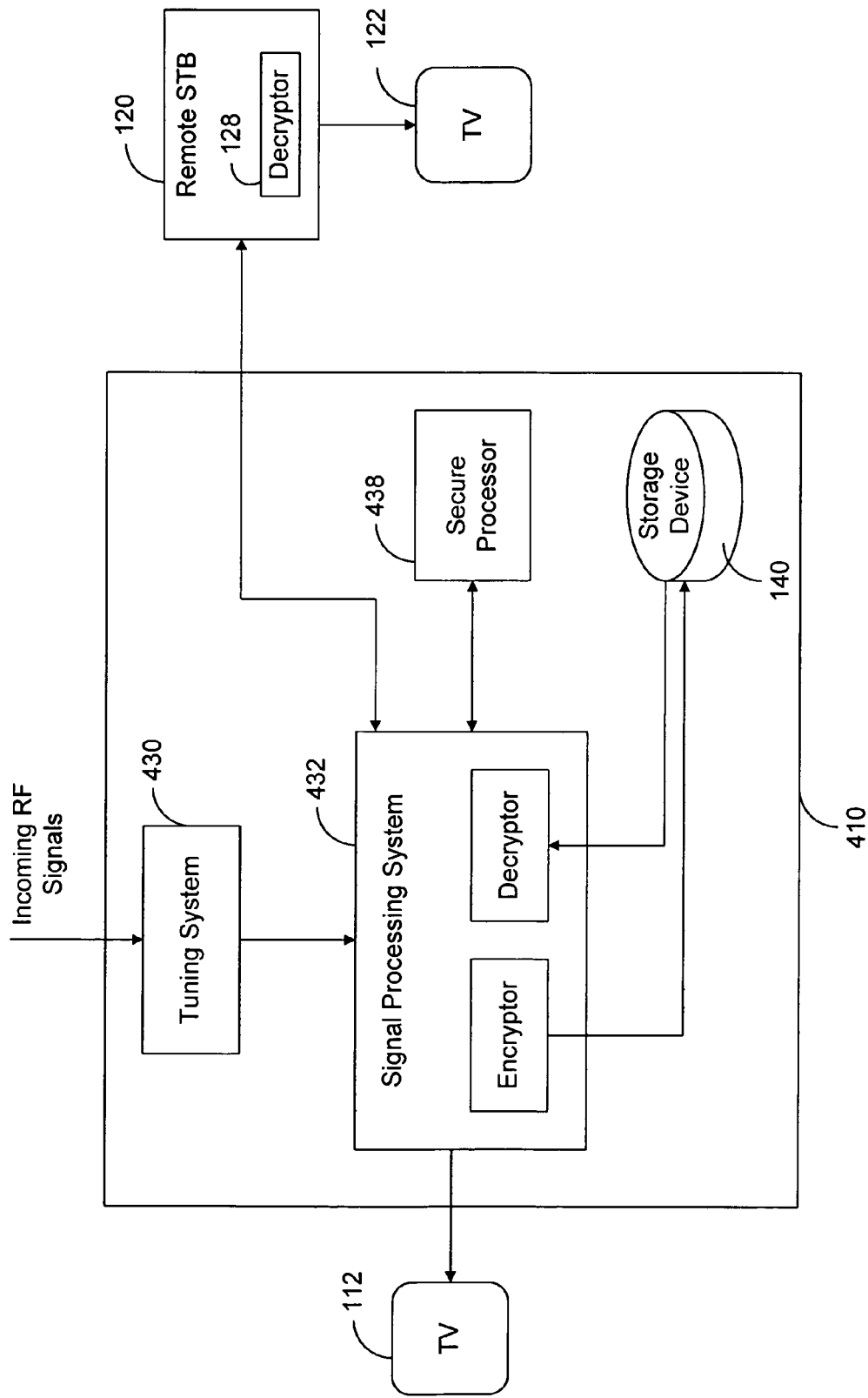
FIG. 4 illustrates generalized block diagram of a second interactive digital STB having the storage device of the digital STB of FIG. 1 according to one embodiment of the present invention.

A public key of another operational STB, such as STB 410 of FIG. 4, that has been or will be provided to the subscriber, could be used to re-encrypt the original content instance key or to encrypt a newly generated content instance key generated by the CTD. Another public key for encrypting/re-encrypting a duplicate of the instance key may be the public key of one or more of the MSO's headends.

The STB 410 of FIG. 4, which is preferably similar to STB 110 of FIG. 1, can include tuning system 430, signal processing system 432 and secure processor 438, but may instead be substantially different so long as the STB 410 may access the storage device 140 or some other storage device which has the retrieved content from the storage device 140 transferred to it. As shown in FIG. 4, the storage device 140 becomes the internal hard drive of the STB 410, but may instead be an external hard drive or some other external storage device.

As shown in process block 390 of FIG. 3, the re-encrypted content may then be re-recorded to the storage device 140. The encrypted/re-encrypted DRM parameters and the one or more encrypted/re-encrypted instance keys may be stored on the storage device 140 in association with the re-encrypted content. The one or more encrypted/re-encrypted instance keys and encrypted/re-encrypted DRM parameters stored in association with the re-encrypted content transferred to the storage device 140, once decrypted with corresponding one or more private keys, may then be utilized to decrypt the re-encrypted content on the storage device 140. For, example, if the user wishes to view any of the transferred content from the storage device 140 with the STB 410, the private key of the STB 410 is utilized to decrypt the instance key that encrypted the content to be viewed. In the event the STB 410 subsequently also fails, and the stored content is to be retrieved again from the storage device 140, the private key that corresponds with the one or more public keys that encrypted/re-encrypted a duplicate of the content instance key is utilized to decrypt the content instance key so that the content can then be decrypted, retrieved and transferred, if desired.

Figure 5:
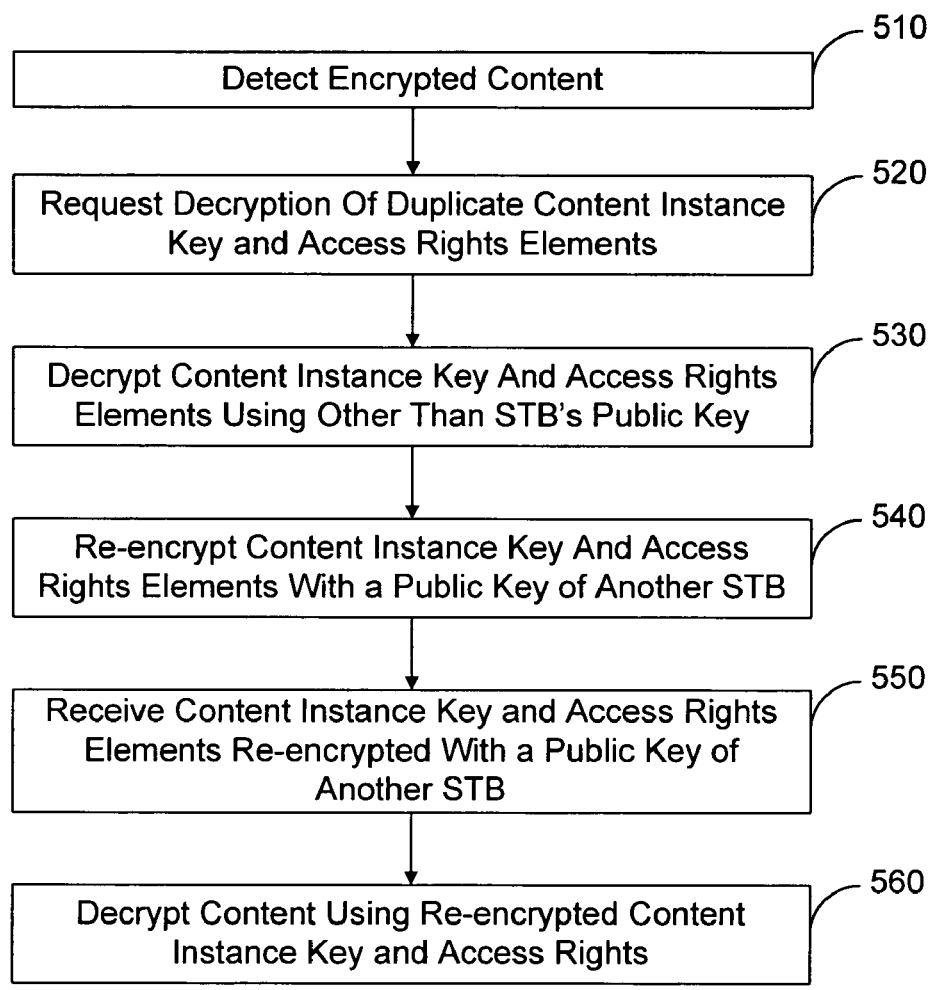
FIG. 5 is a flow chart illustrating an alternative embodiment of a content retrieval and transfer system of the present invention.

In an alternative embodiment according to the present invention, the process illustrated in FIG. 3 may be modified so that content may be transferred directly for use on another STB. FIG. 5 illustrates one embodiment of the modifications to the process illustrated in FIG. 3. Once the storage device 140 has been removed from the failed STB 110, the storage device 140 may then be coupled to an operational replacement STB such as STB 410. As shown in process block 510, the replacement STB 410 may detect the encrypted content on storage device 140 at the subscriber premises. In such case, the STB 410 requests decryption of the duplicate encrypted content instance key by sending a message upstream to the MSO headend as shown in process block 520. The upstream message indicates that the STB 410 is a replacement STB for the stored content of the storage device 140 and provides the encrypted instance key and encrypted access rights elements for decryption. Once the upstream message is authenticated using digital signature methods well known in the art as being from the subscriber with the replacement STB 410, the encrypted content instance key and access rights elements are decrypted with the private key that corresponds with the public key of the headend or other public keys that had encrypted both the content instance key and the access rights elements, as shown in process block 530.

In process block 540, the content instance key and access rights elements are re-encrypted with the public key of the replacement STB 410 and preferably with other public keys of other than the replacement STB 410. The access rights elements may be modified as part of the recovery process. A downstream message that includes the re-encrypted content instance key and access rights elements is then sent to the replacement STB 410. The replacement STB 410 will then receive the downstream message with the re-encrypted content instance key and access rights elements, as shown in process block 550, so that the stored content from the storage device 140 can be viewed utilizing the replacement STB 410. Therefore, the content originally encrypted with the secure microprocessor 138 of the failed STB 110 may be decrypted by the replacement box 410 without the original secure microprocessor 138, as shown in block 560, by the replacement STB 410 using its own private key which corresponds with the public key utilized to re-encrypt the content instance key and access rights elements received from the downstream message.

However, instead of retrieving and transferring an instance of encrypted content, it may be desirable to just decrypt the DRM parameters to determine the subscriber's access rights despite no longer having access to the original secure microprocessor. The flow chart of FIG. 6 illustrates one embodiment for storing encrypted DRM parameters in association with encrypted content to the storage device while utilizing the original secure microprocessor, and according to one embodiment of the present invention, the DRM parameters may subsequently then be retrieved without utilizing the original secure microprocessor by other public key users.

Figure 6:
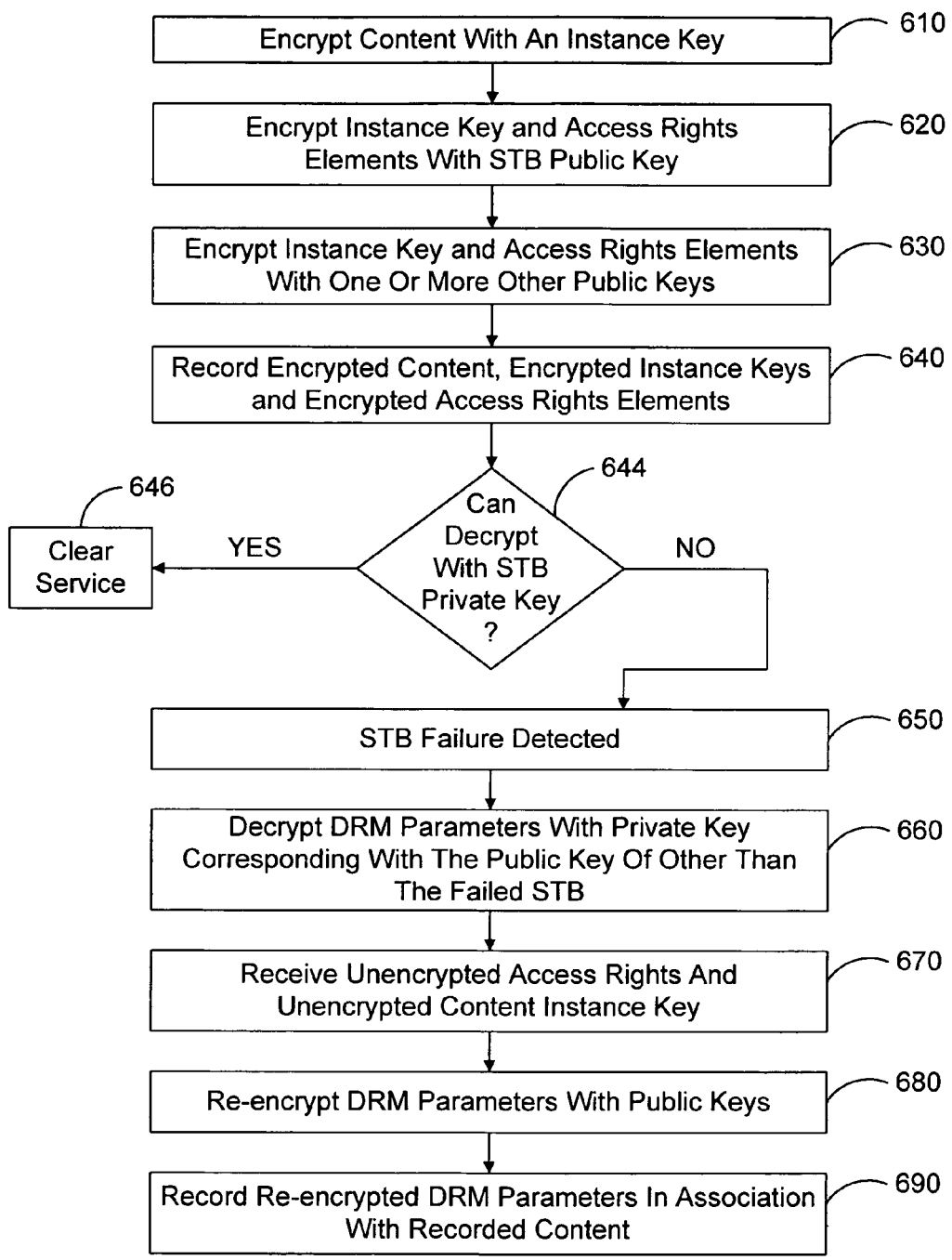
FIG. 6 is a flow chart illustrating another embodiment of an access rights elements retrieval and transfer system of the present invention.

The initial steps of the process of FIG. 6 are substantially similar to the initial steps of the process of FIG. 3 described above. However, the processes of FIGS. 3 and 6 are distinguishable from one another after a STB failure has been detected. The process of FIG. 6 is initiated at process block 610 where the content to be recorded to the storage device 140 is encrypted with the content instance key, as explained above. Then, as shown in process block 620, the content instance key and the corresponding access rights elements are encrypted with the public key of the STB 110. The encrypted instance key and access rights elements can be decrypted with a private key that corresponds with the STB 110's public key in a defined public/private key pair. However, in the present invention as shown in process block 630, a duplicate of the content instance key and a duplicate of the corresponding access rights elements are also encrypted with one or more public keys of other than the STB 110. For example, the duplicate of the content instance key and the duplicate of the access rights elements may be encrypted with the public key of one or more of the MSO's headends. The content encrypted with the content instance key, the encrypted DRM parameters having the content instance key and corresponding access rights elements, and the DRM parameters with the duplicate content instance key encrypted by one or more other public keys, are all stored on the storage device 140 in association with one another as shown in block 640.

At decision block 644, if the STB 110 can decrypt the DRM parameters on the storage device 140, the stored instance is then provided in the clear, as shown in process block 646, to the television 112. On the other hand, if the STB 110 has failed and can no longer decrypt utilizing its original secure microprocessor 138, a STB failure is detected as indicated in process block 650. The storage device 140 may then be removed or detached from the failed STB. As explained above, the storage device 140 may itself be forwarded to the service provider so that the DRM parameters may be decrypted and re-encrypted and transfered back onto the storage device 140 or any other storage device.

Still referring to FIG. 6, at process block 660, the DRM parameters having a duplicated content instance key and corresponding access rights elements may be decrypted with the private key that corresponds with the public key that had encrypted the duplicate content instance key of the DRM parameters. Then, once the unencrypted access rights and unencrypted content instance key are received, as shown in process block 670, the subscriber's access rights may be modified as part of the recovery process, if permitted by the content providers. Process block 680 illustrates one or more DRM parameters then being re-encrypted with one or more other public keys, respectively. The re-encrypted DRM parameters may then be recorded on the storage device 140 or any other storage device in association with recorded content.

In another alternative embodiment of the present invention, a STB 710 may be coupled to one or more remote STBs 720 in a manner that is commonly referred to as multi-room configuration as shown in FIG. 7. In the event that both the STB 710 and STB 720 have similar DVR functionality, the encrypted content recorded to a storage device of one STB may be transferred to the other STB. In the context of the present invention, transferring encrypted content from one STB to another STB is distinguishable from playing content on one STB that had been encrypted and stored by another STB. For example, STB 710 can record encrypted content to removable storage media such as disk 730. Each instance recorded onto the removable disk 730 is encrypted with a content instance key in a manner similar to that explained above in regard to either STB 110 or STB 410. The public key of the STB 710 then encrypts the content instance key. In order to retrieve the encrypted content recorded onto the removable disk 730 for display on television 112, the private key of the STB 710 that corresponds with the STB 710's public key is provided.

In order to transfer the removable disk 730 to STB 720 and allow the STB 720 to use the encrypted content which had been recorded onto the removable disk 730 by STB 710, the STB 720 must be able to decrypt a content instance key which encrypted the recorded content stored on the removable disk 730. Therefore, a duplicate of the original content instance key is also encrypted with the public key of the STB 720. The DRM parameters, having the access rights associated with the use of the recorded content on the STB 720, must also be transferred along with the encrypted content on the removable disk 730.

The encrypted duplicate content instance key may then be decrypted by the corresponding private key of the STB 720. Any number of duplicate content instance keys may each be encrypted by public keys of other than the STB 710 so that the content may be transferred to and decrypted by other STBs or other devices. In one embodiment, the STB 720 may notify the STB 710 of its presence in the multi-room network or the STB 710 may detect the presence of the STB 720 upon coupling the STB 710 and STB 720 together to create the multi-room environment. In such case, the STB 710 could receive and store the public key of the STB 720 or any other STBs or devices utilized in the multi-room configuration. The STB 710 could receive the public key of STB 720 directly from STB 720 or from a MSO headend. In another embodiment, the STB 710 could encrypt one or more duplicate content instance keys with stored or received public keys of other STBs or devices regardless of whether or not these other STBs or devices are currently included within the multi-room network.

U.S. patent application Ser. No. 10/873,805 entitled "VALIDATING CLIENT-RECEIVERS", filed Jun. 22, 2004, which is entirely incorporated herein by reference, discloses validating a DVR-based STB with a headend as well as validating other remote STBs in a multi-room environment with the DVR-based STB. Before the DVR-based STB plays recorded programming which may be restricted, the DVR-based STB validates that the remote STBs are valid client-receivers or components of the subscriber television system. Secure communication between the headend, the DVR-based STB and the remote STBs is accomplished using pairs of asymmetrical keys known to those skilled in the art such as RSA public key encryption technology. For example, after public keys are exchanged, a message from the headend for any of the STBs is encrypted with the public key of the DVR-based STB. The DVR-based STB can then decrypt the message with its corresponding private key. Also, a message from the headend signed with its private key can be authenticated with the corresponding public key of the headend.

In one embodiment of the present invention, the validating procedure between the headend and the STB 710, for example, would include a list of certificates, having the public keys of the other STBs or components needed to encrypt duplicate content instance keys, maintained at the headend that the STB 710 could trust. The headend would transmit a secure message, providing one or more encrypted certificates, encrypted with the public key of the STB 710. The headend could also use its private key to sign the message/certificates transmitted from the headend to the STB 710 where, after the STB's corresponding private key is used to decrypt the certificates, the STB 710 could then use the headend's corresponding public key to authenticate the certificates.

In another embodiment, the validating procedure between the STB 710 and remote STB 720, for example, to verify that the remote STB 720 is a valid component in the multi-room environment and the subscriber television system, can be used to provide the STB 720's public key to the STB 710 without any upstream communication with the headend. The STB 710 receives a validation message generated by the remote STB 720 that includes message content and an authentication token. The content of the validation message could include an identifier such as the STB's public key. After the STB 710 has validated the remote STB 720 by comparing the authentication token from the STB 720 with another locally generated authentication token, the STB 710 has the remote STB's public key that can be used to encrypt content instance keys as explained above.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A method for retrieval and transfer of encrypted content from a first set-top box, said method comprising the following steps:
   - at said first set-top box, encrypting content to be stored on a first storage device of the first set-top box with a content instance key, said content comprising a program instance;
   - at said first set-top box, encrypting said content instance key with a public key of the first set-top box;
   - at said first set-top box, encrypting a duplicate of said content instance key with one or more public keys of other than the first set-top box;
   - encrypting access rights elements to said content with said one or more public keys of other than first set-top-box, said access rights elements configured to be reviewed to determine a user's access to said content;
   - recording said content encrypted with said content instance key and said encrypted content instance key to said first storage device;
   - decrypting said duplicate content instance key that was encrypted at said first set-top box by using a private key corresponding with said one or more public keys of other than said first set-top box; and
   - decrypting said content with said decrypted duplicate content instance key.

2. The method of claim 1 further comprising the step of recording said encrypted duplicate content instance key on said first storage device.

3. The method of claim 1 wherein said decrypting said duplicate content instance key using a private key corresponding with said one or more public keys of other than the first set-top box is performed in response to not being able to decrypt said content with a private key corresponding with said public key of the first set-top box.

4. The method of claim 1 further comprising the step of re-encrypting said content using one of said content instance keys.

5. The method of claim 1 further comprising the step of re-encrypting said content using a new content instance key.

6. The method of claim 5 further comprising the step of encrypting said new content instance key with a public key of a second set-top box.

7. The method of claim 5 further comprising the stops of encrypting said new content instance key with a public key of a second set-top box and re-recording said re-encrypted content onto said first storage device.

8. The method of claim 5 further comprising the steps of encrypting said new content instance key with a public key of a second set-top box, re-recording said re-encrypted content onto the first storage device, and installing said first storage device in said second set-top box.

9. The method of claim 5 further comprising the steps of encrypting said new content instance key with a public key of a second set-top box and re-recording said re-encrypted content onto a second storage device.

10. The method of claim 1 further comprising the step of re-encrypting said one of said content instance keys with a public key of a second set-top box.

11. The method of claim 1 further comprising the steps of re-encrypting said one of said content instance keys with a public key of a second set-top box and re-recording said re-encrypted content onto said first storage device.

12. The method of claim 1 further comprising the steps of re-encrypting said one of said content instance keys with a public key of a second set-top box, re-recording said re-encrypted content onto the first storage device, and installing said first storage device in said second set-top box.

13. The method of claim 1 further comprising the steps of re-encrypting said one of said content instance keys with a public key of a second set-top box and re-recording said re-encrypted content onto a second storage device.

14. The method of claim 1 wherein said decryption step is performed by a content decryption device having said private key to decrypt said duplicate content instance key.

15. The method of claim 1 further comprising re-encrypting said duplicate content instance key with a public key of a second set-top box.

16. The method of claim 1 further comprising encrypting a new content instance key with a public key of a second set-top box.

17. The method of claim 1 further comprising the step of detecting a failure of the first set-top box where a private key corresponding with said public key of the first set-top box is inaccessible.

18. The method of claim 1 further comprising the step of a second set-top box coupled to said first storage device detecting encrypted content recorded on said first storage device.

19. The method of claim 1 further comprising the step of a second set-top box coupled to said first storage device requesting decryption of said duplicate content instance key.

20. The method of claim 1 further comprising the step of a second set-top box coupled to said first storage device receiving said duplicate content instance key encrypted with a public key of said second set-top box.

21. The method of claim 1 further comprising the step of sending a message that a second set-top box coupled to said first storage device requires decryption of said duplicate content instance key.

22. The method of claim 1 further comprising the step of encrypting access rights elements with said duplicate content instance key.

23. The method of claim 22 further comprising the step of decrypting said access rights elements with said decrypted duplicate content instance key.

24. A system for retrieval and transfer of at least a portion of encrypted content from a first storage device of a first set-top box, comprising:
- said first storage device of said first set-top box, said first storage device comprising content encrypted at said first set-top box with a content instance key, said content comprising a program instance,
- a first occurrence of said content instance key encrypted at said first set-top box with a public key of said first set-top box,
- another occurrence of said content instance key encrypted at said first set-top box with a public key of other than said first set-top box; and
- access rights elements encrypted with said public key of other than said first set-top box;
- wherein said another occurrence of said content instance key is decrypted by a private key corresponding with said public key of other than the first set-top box, and at least a portion of said content is decrypted with said another occurrence of said content instance key; and
- a content transcription device, said content transcription device configured to decrypt said another occurrence of said content instance key with said private key corresponding with said public key of other than said first set-top box.

25. The system of claim 24 wherein at least a portion of said content of said first storage device is free from having been decrypted with a private key corresponding with said public key of the first set-top box.

26. The system of claim 24 wherein at least a portion of said content is re-encrypted using said another occurrence of said content instance key and said other occurrence of said content instance key is re-encrypted by a public key of a second set-top box.

27. The system of claim 26 wherein said first storage device with said re-encrypted content is installed in said second set-top box.

28. The system of claim 26 wherein at least a portion of said re-encrypted content is re-recorded to a second storage device.

29. The system of claim 24 wherein at least a portion of said content is re-encrypted using a new content instance key and said new content instance key is encrypted by a public key of a second set-top box.

30. The system of claim 29 wherein said first storage device with said re-encrypted content is installed in said second set-top box.

31. The system of claim 29 wherein at least a portion of said re-encrypted content is re-recorded to a second storage device, 32. The system of claim 24 wherein at least a portion of said content is re-encrypted using said another occurrence of said content instance key and said other occurrence of said content instance key is re-encrypted by a public key of a multiple systems operator's (MSO's) headend.

33. The system of claim 24 wherein at least a portion of said content is re-encrypted using a new content instance key and said new content instance key is encrypted by a public key of a multiple systems operator's (MSO's) headend.

34. The system of claim 24 further comprising a content decryption device having said private key to decrypt said other occurrence of said content instance key.

35. The system of claim 24 further comprising a second set-top box coupled to said first storage device wherein said second set-top box detects encrypted content on said first storage device and requests decryption of said another occurrence of said content instance key.

36. The system of claim 35 wherein said second set-top box receives said another occurrence of said content instance key encrypted with a public key of said second set-top box.

37. A method for retrieval and transfer of encrypted access rights elements to content from a first set-top-box, said access rights elements configured to be reviewed to determined a user's access to content, said method comprising the following steps:
- at said first set-top box, encrypting access rights elements to contents to be stored on a first storage device of the first set-top box with a content instance key, said content comprising a program instance;
- at said first set-top box encrypting said content instance key with a public key of the first set-top box;
- at said first set-top box, encrypting a duplicate of said content instance key with one or more public keys of other than the first set-top box;
- decrypting said encrypted duplicate content instance key; and
- decrypting said access rights elements with said decrypted duplicate content instance key.

38. The method of claim 37 wherein said duplicate content instance key is decrypted by using a private key corresponding with said one or more public keys of other than the first set-top box.

39. The method of claim 38 further comprising the step of re-encrypting said access rights elements using one of said content instance keys.

40. The method of claim 38 further comprising the step of re-encrypting said access rights elements using a new content instance key.

41. The system of claim 24, wherein said storage device comprises digital rights management (DRM) parameters encrypted by said public key of other than said first set-top box.

* * * * *

UNITED STATES PATENT AND TRADEMARK OFFICE
CERTIFICATE OF CORRECTION

PATENT NO. : 7,630,499 B2
APPLICATION NO. : 10/920926
DATED : December 8, 2009
INVENTOR(S) : Anthony J. Wasilewski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1246 days.

Signed and Sealed this

Twenty-first Day of December, 2010

David J. Kappos
*Director of the United States Patent and Trademark Office*